United States Patent [19]

Barzuza

[11] Patent Number: 4,462,622

[45] Date of Patent: Jul. 31, 1984

[54] PIPE CONNECTOR

[75] Inventor: Yzhak Barzuza, Petak Tikva, Israel

[73] Assignee: Filtration Water Filters for Agriculture & Industry Ltd., Tel Aviv, Israel

[21] Appl. No.: 379,201

[22] Filed: May 17, 1982

[30] Foreign Application Priority Data

May 24, 1981 [IL] Israel ....................................... 62945

[51] Int. Cl.³ .................... F16L 21/06; F16L 39/00; F16L 17/00
[52] U.S. Cl. ..................................... 285/323; 285/321; 285/104; 285/255; 285/DIG. 22
[58] Field of Search ............... 285/323, 322, DIG. 22, 285/321, 104, 105, 255, 243, 242

[56] References Cited

U.S. PATENT DOCUMENTS

| | | |
|---|---|---|
| 2,935,343 | 5/1960 | Ellis . |
| 3,909,046 | 9/1975 | Legris . |
| 4,005,883 | 2/1977 | Guest . |
| 4,005,884 | 2/1977 | Drori . |
| 4,021,062 | 5/1977 | Mariaulle . |
| 4,083,586 | 4/1978 | Helm .................................. 285/323 |
| 4,097,076 | 6/1978 | Wackenreuther et al. . |
| 4,178,023 | 12/1979 | Guest . |
| 4,240,651 | 12/1980 | Mariaulle . |
| 4,266,814 | 5/1981 | Gallagher . |
| 4,304,426 | 12/1981 | Francis ................................ 285/323 |
| 4,335,908 | 6/1982 | Burge .............................. 285/323 X |

Primary Examiner—Richard J. Scanlan, Jr.
Attorney, Agent, or Firm—Sughrue, Mion, Zinn, Macpeak, and Seas

[57] ABSTRACT

There is provided a quick-action push-in connector for fluid-carrying tubing. The connector comprises an outer member having fluid passage means and an inner member at least partly accommodatable in the outer member. The inner member has a substantially central passage adapted to admit the tubing and to allow the same to communicate with the fluid passage means and is provided with at least one inwardly directed gripping protrusion adapted to engage the tubing. At least at the protrusion, the inside diameter of the inner member is elastically reducible by interaction of the inner member with at least a portion of the outer member, and elastically expandable by application of a spreading force, and is in the free, unreduced state, smaller than the outside diameter of the tubing and adapted to undergo an initial expansion when the tubing is pushed in. An attempt to pull out the tubing once pushed in will initiate the interaction, whereby the protrusion exerts a gripping effort on the tubing, preventing the withdrawal thereof.

7 Claims, 6 Drawing Figures

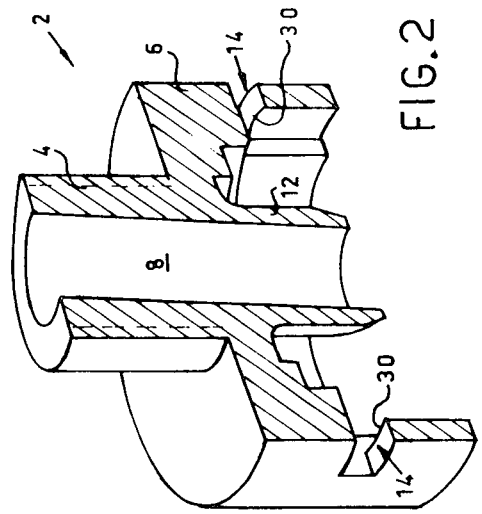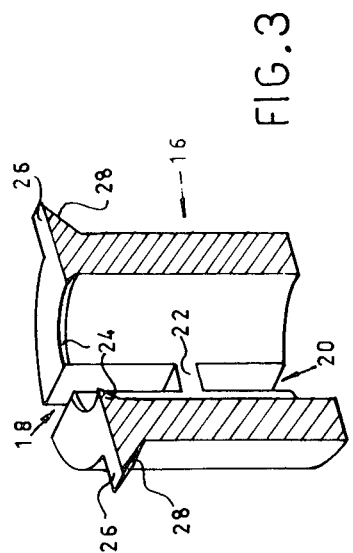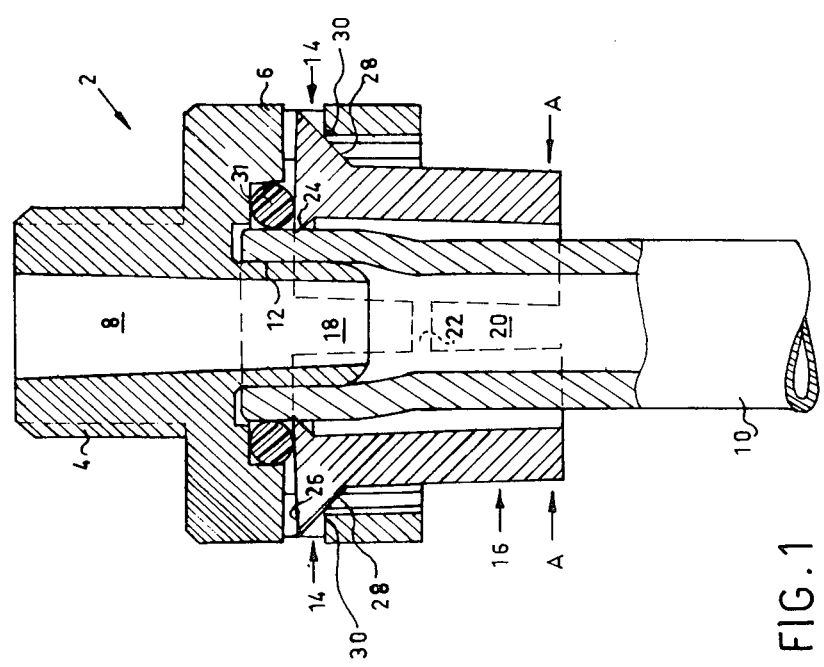

PIPE CONNECTOR

The present invention relates to a quick-action, push-in connector for fluid-carrying tubing, more particularly for plastic fluid-carrying tubing.

Of the great variety of tubing connectors known, the largest groups are the threaded flare connectors in their different forms. In these connectors, the flared end of the tubing is pressed against the mating surface of the connector, producing a leak-proof conical seal. However, as flared ends are difficult to produce in plastic tubing, these connectors are not suitable for use with the latter. Frequently used are threaded flareless connectors of the ferrule type, in which the sealing effect is obtained by forcing the edge of a ferrule or sleeve into the tubing wall, thereby obtaining an interference seal. Other connectors use a tapered sleeve, integral with the nut, which, upon tightening of the nut, rides up on a corresponding taper in the socket and is thus forced into the tubing. All of these connectors have, however, one thing in common: they make use of a threaded nut, which has to be tightened to obtain the fluid-tight connection, and untightened, to remove the tubing.

Now, while in permanent installations the occasional need to tighten or loosen a nut might not be objectionable, development work in fluidics, the experimental or temporary setting up ("bread-boarding") of logic circuits, or work with such pneumatic components as cylinders, valves, etc., which are routinely used in industrial automation, may entail the need to connect, disconnect and reconnect tens of fluid lines within short periods of time. In such cases substantial savings in time—and frazzled nerves—could be achieved with non-threaded connectors. In other fields of application, e.g., irrigation, in particular drip irrigation, in which much, if not all, of the preparatory work is done in the field threaded parts easily fail, with subsequent jamming and/or leaking.

It is one of the objectives of the present invention to overcome these and other difficulties and drawbacks of the prior art and to provide a tubing connector in which leak- and pressure-proof connection is established by simply pushing in the tubing to be connected, and disconnection is effected by an equally simple and rapid operation, the only thread in the connector being the thread by which it is permanently connected to be fluid controlled or fluid-controlling component it serves.

This the present invention achieves by providing a quick-action push-in connector for fluid-carrying tubing, comprising an outer member having fluid passage means, and an inner member at least partly accommodatable in said outer member, said inner member having a substantially central passage adapted to admit said tubing and to allow the same to communicate with said fluid passage means, and being provided with at least one inwardly directed gripping protrusion adapted to engage said tubing, wherein at least at said protrusion the inside diameter of said inner member is elastically reducible by interaction of said inner member with at least a portion of said outer member, and elastically expandable by application of a spreading force, and is in the free, unreduced state smaller than the outside diameter of said tubing, and adapted to undergo an initial expansion when said tubing is pushed in, and wherein an attempt to pull out said tubing once pushed in, will initiate said interaction, whereby said protrusion exerts a gripping effort on said tubing, preventing the withdrawal thereof.

The tubing connectors according to the invention have a pullout resistance which is limited only by the tensile strength of the plastic tubing material.

While the invention will now be described in connection with certain preferred embodiments, it will be understood that it is not intended to limit the invention to these particular embodiments. On the contrary, it is intended to cover all alternatives, modifications and equivalent arrangements as may be included within the scope of the invention as defined by the appended claims. Nevertheless it is believed that embodiments of the invention will be more fully understood from a consideration of the following illustrative description read in conjunction with the accompanying drawings, in which:

FIG. 1 is an enlarged, cross-sectional view of a first embodiment of the fully assembled tubing connector according to the invention;

FIG. 2 is a perspective view, in cross section, of the outer member of the connector of FIG. 1;

FIG. 3 is a perspective view, in cross section, of the inner member of the connector of FIG. 1;

Figure 5:
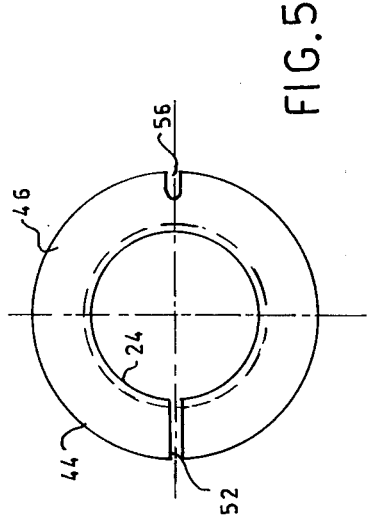
FIG. 5 shows a top view of the inner member of the embodiment of FIG. 4.

Referring now to the drawings, there is seen in FIG. 1 an outer member 2 consisting of a threaded stem 4 by means of which the connector is attached to the component it serves, and a cup-like body 6. A bore 8 serves as a fluid passage between said component and the tubing 10, which is made of the relatively soft and pliable plastic routinely used in, e.g., pneumatic and other medium-pressure devices. A leak-proof seal between the connector bore 8 and the tubing 10 is ensured by the nipple 12 projecting into the cavity of the body 6. The outside diameter of this nipple 12 is slightly larger than the inside diameter of the tubing 10 which, by forcing it over the nipple 12, is thus elastically expanded, its resistance to such expansion providing the required sealing force. The nipple 12 as well as other details of the outer member 2 to be discussed further below are seen to better advantage in the perspective view of FIG. 2. The body 6 is furthermore provided with two diametrically opposite windows 14, the purpose of which will become apparrent further below.

Cooperating with the above explained outer member 2 is an inner member 16, shown in cross section in FIG. 1 and in cross-sectional perspective in FIG. 3. As can be seen from FIG. 1 and FIG. 3 (bearing in mind that FIG. 3 being a cross section, shows only one, longitudinal, half of the part), the inner member 16 is substantially tubular and is almost cut into two longitudinal halves by two diametrical slots, an upper slot 18 and a lower slot 20 closely approaching one another, leaving between them only two thin, strip-like sections, one on each side, which, due to the elastic properties of the material, are able to flex and thus function as integral hinges 22, about which the two longitudinal halves of the inner member 16 can tilt when radial forces are applied to them in a plane normal to the hinge axis. For most of its length, the bore of the inner member 16 is substantially cylindrical and considerably larger than the outside diameter of tubing 10. The upper end of this bore (referring to the position in which the inner member 16 appears in FIGS. 1 and 3) is, however, narrower than this bore and constitutes a gripping protrusion which, in this particular embodiment is in the shape of two nearly semicircular sharp-edged lips 24. In the non-flexed state of the hinges 22, these lips 24 define a circle of a diameter slightly smaller than the diameter of the tubing 10. At the same lip-side end, the inner member 16 is provided with two peripheral, wedge-like projections 26, the upper faces of which are substantially co-planar with the upper end of the inner member 16, and the lower faces 28 of which are inclined.

In assembly, the inner member 16 is located with its upper half inside the cavity of the body 6, with the inclined faces 28 of the projections 26 resting on the inner edges 30 of the "sills" of windows 14 (see also FIG. 2). To facilitate introduction of the inner member 16 into the cavity of the body 6 (prior to the connection of tubing 10), the thickness of the peripheral wall of the body 6 below the windows 14 has been reduced, as is clearly seen in FIG. 2. By spreading the lower end of the lower slot 20, the upper end of the upper slot 18 is compressed due to the action of the hinge 22 and the distance between the tips of the wedge-like projections 26 is sufficiently reduced to permit the introduction of the inner member 16. When the hinges 22 are now left to return to their non-flexed state, the projections 26 will snap into the windows 14.

When now a length of tubing 10 is to be connected, the following happens:

With the inner member 16 already in the above-described assembled position, the tubing 10 to be connected is introduced into the inner member 16 and pushed onto the nipple 12. As soon as the tubing 10 makes contact with the lips 24, the latter are slightly spread apart-against the restoring force of the hinge 22—since, as explained above, the outside diameter of the tubing 10 is somewhat larger than the diameter of the circle defined by the lips 24 in the non-flexed state of the hinges 22. This "prestressing" is of great importance for the pullout resistance of the connector, as will become apparent below. Equally important is the fact that the coefficient of friction between the material of the tubing 10 (soft plastic) and the materical of the lips 24 (hard plastic) is very large. Consequently, a pullout force applied to the tubing 10 either by direct mechanical action or due to pressure inside the system itself, will be transferred immediately, via the sharp-edged lips 24, also to the inner member 16 since, due to the above-explained frictional relationship, the lips 24 will not permit the tubing 10 to freely slip out from under them, especially since the above-mentioned "prestressing" has already caused the lips 24 to slighly "bite" into the tubing 10. Yet any such pullout-force-caused downward movement of the inner member 16, resting as it does with the inclined faces 28 of its projections 26 on the edges 30 of the windows 14, will produce an "inclined-plane" effect, whereby, facilitated by the flexing of the hinges 22, the lips 24 will be forced inwards, increasing their "bite" and, thus, their hold on the tubing 10. In this context, the term "bite" should be understood to connote a compressive-deformative, rather than a cutting effect.

For larger pressures and more critical applications, it is advantageous to add an O-ring 31.

Disconnecting the tubing 10 is equally simple. In order to be able to pull off the tubing 10, the lips 24 must be made to release their grip on the latter. This is done by using the fingers of one hand to exert pressure on the lower ends of the inner member 16, as indicated by the arrows A. Due to the movement-inverting action of the hinges 22, this will cause the lips 24 to spread, permitting the tubing 10 to be pulled off the nipple 12 by the other hand.

Figure 4:
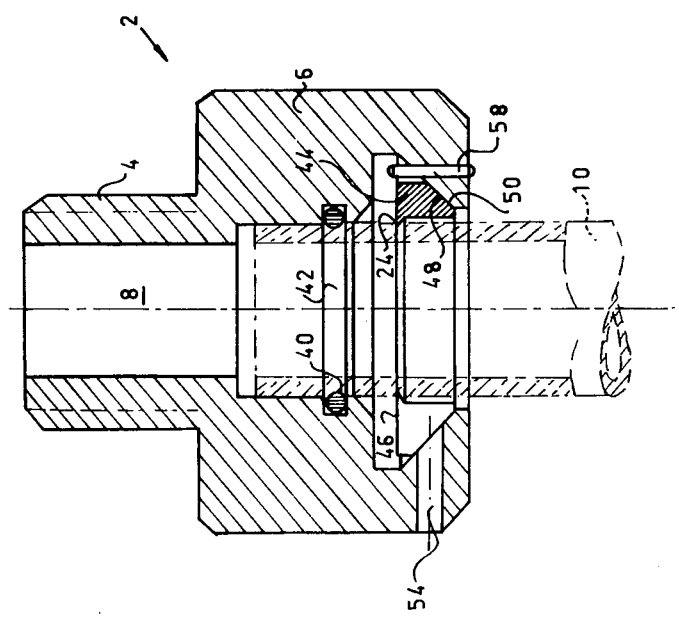
FIG. 4 is a cross-sectional view of another embodiment of the tubing connector according to the invention.

Another embodiment of the connector according to the invention is shown in FIG. 4. This embodiment is particularly suitable for large-diameter tubing. There is again seen an outer member 2 consisting of a threaded stem 4 and a body 6, with a bore 8 serving as a fluid passage. In this embodiment, sealing is effected by an O-ring 40 seated in a groove 42, although the body 6 could be designed to comprise also a nipple similar to nipple 12 of the previous embodiment.

The inner member of this embodiment consists of a ring 44 (see also FIG. 5), the upper surface 46 of which is co-planar with the sharp-edged lip 24 and the lower surface 48 of which is conical and rests on a correspondingly conical surface 50 that delimits a portion of the body 6. As was the case in the previous embodiment, here, too, the inner member, i.e., the ring 44, must have an inside diameter that is reducible as well as expandable. This is achieved by rendering it elastically deformable through the provision of a slot 52 (FIG. 5).

Here, too, the diameter of the circle defined by the sharp-edged lip 24 is smaller than the outside diameter of the tubing 10. Thus, when the tubing 10 is pushed into the assembled connector, the ring 44 has to slightly expand to admit the tubing 10, thereby acquiring the "prestressing" needed to provide the friction required to prevent tubing slippage. A pullout force acting on the tubing 10 will thus also act on the ring 44, in which case the conicity of the ring surface 48 and the seating surface 50 will cause the ring 44 and the lip diameter to contract, thereby increasing its "bite" and consequent hold on the tubing 10.

To disconnect the tubing 10, a spreading force must be applied to the split ring 44, which will make it expand and release the hold of the lip 24 on the tubing 10. Application of such a force is facilitated by the provision of a radial hole 54 leading from the outside into the zone of the conical seating surface 50. By providing a locating groove 56 in the ring 44 (see FIG. 5) and a locating pin 58 in the body 6, the respective center planes of the slot 52 and the hole 54 can be made to permanently coincide. A screwdriver blade can then be introduced via the hole 54 into the slot 52. Twisting the screwdriver will now spread the ring 44 and release the tubing 10, which can then be pulled out.

Figure 6:
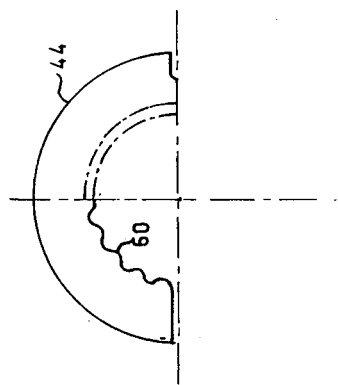
FIG. 6 is a partial top view of another embodiment of the inner member of FIG. 4.

For additional safety and pullout resistance, the sharp-edged lip 24 of FIGS. 4 and 5 may be modified as shown in FIG. 6, where the continuous edge has been broken up into a plurality of discrete, bread-knife-like teeth 60, the totality of the gripping points of which defines a curve substantially circular. The elastic restoring force exerted by the "prestressed" ring 44 is now concentrated in a number of points rather than being distributed over the entire periphery of the lip 24.

It is obvious that the sharp-edged lip 24 of the previous embodiment could be similarly modified.

It will be evident to those skilled in the art that the invention is not limited to the details of the foregoing illustrative embodiments and that the present invention may be embodied in other specific forms without departing from the essential attributes thereof, and it is, therefore, desired that the present embodiments be considered in all respects as illustrative and not restrictive, reference being made to the appended claims, rather than to the foregoing description, and all changes which come with the meaning and range of equivalency of the claims are, therefore, intended to be embraced therein.

What is claimed is:

1. A quick-action push-in connector for fluid-carrying tubing, said connector comprising: an outer member having fluid passage means, a substantially tubular inner member at least partially, axially accommodated to said outer member, said inner member having a substantially central passage adapted to admit said tubing to effect communication of said tubing with said fluid passage means, said inner member being provided with at least one inwardly directed gripping protrusion to engage said tubing, said tubular member being constituted by at least two longitudinal portions, means for articulating said longitudinal portions to one another having an axis of articulation substantially perpendicular to and intersecting the axis of said tubular inner member, said gripping protrusion being borne by said longitudinal portion proximate to said fluid passage means of said outer member, and wherein at least at said protrusion the inside diameter of said inner member is reducible against an elastic restoring force by interaction of said inner member with at least a portion of said outer member, and expandable against said restoring force by application of a spreading force, and is in the free, unreduced state smaller than the outside diameter of said tubing, and adapted to undergo an initial expansion when said tubing is pushed in, and wherein an attempt to pull out said tubing once pushed in, initiates said interaction, whereby said protrusion exerts a gripping effort on said tubing, preventing the withdrawal thereof, and wherein said longitudinal portion of said tubular inner member remote from said fluid passage means of said outer member extends beyond said outer member for permitting a compressive force to be applied thereto, resulting in a reactive expansion of said longitudinal portion of said tubular inner member bearing said gripping protrusion to release said tubing and permit withdrawal thereof.

2. The connector as claimed in claim 1, wherein said gripping protrusion is a substantially circular, substantially sharp-edged lip.

3. The connector as claimed in claim 1, wherein said tubular inner member is slotted at diametrically opposed positions from both ends inwardly over a substantial length to form said two longitudinal portions interconnected at approximately the center of said tubular inner member by two narrow connecting strips constituting integral hinges, rendering said inner member elastically deformable and providing said elastic restoring force.

4. The connector as claimed in claim 1, wherein said inner member is provided with at least two projections peripherally located and substantially co-planar with said gripping protrusions, which projections, interacting with the portions of said outer member, are adapted to reduce the inside diameter of said inner member at least at said gripping protrusions.

5. The connector as claimed in claim 1, wherein said portion of said outer member is constituted by at least part of sills defined by at least two window-like openings in the peripheral wall of said outer member.

6. The connector as claimed in claim 1, wherein sealing means are provided to hermetically seal off the fluid in said tubing from the atmosphere.

7. The connector as claimed in claim 6 wherein said sealing means is a nipple tightly fitting the inside of said tubing.

* * * * *